US012605750B2

(12) United States Patent
Tan et al.

(10) Patent No.:   US 12,605,750 B2
(45) Date of Patent:      Apr. 21, 2026

(54) CHARGING SYSTEM AND METHOD FOR CONTROLLING CHARGING SYSTEM

(71) Applicants: KAWASAKI JUKOGYO KABUSHIKI KAISHA, Kobe (JP); Kawasaki Robotics (USA), INC., Wixom, MI (US)

(72) Inventors: Haruhiko Tan, Kobe (JP); Simon Jeyapalan, Newark, CA (US); Theodore Philliber, San Jose, CA (US); Ryan Le, Sacramento, CA (US); Avish Ashok Bharwani, Santa Clara, CA (US); Nobuyasu Shimomura, San Jose, CA (US)

(73) Assignees: KAWASAKI JUKOGYO KABUSHIKI KAISHA, Kobe (JP); Kawasaki Robotics (USA), INC., Wixom, MI (US)

( * ) Notice: Subject to any disclaimer, the term of this patent is extended or adjusted under 35 U.S.C. 154(b) by 126 days.

(21) Appl. No.: 18/395,814

(22) Filed: Dec. 26, 2023

(65) Prior Publication Data

US 2025/0205754 A1      Jun. 26, 2025

(51) Int. Cl.
| | |
|---|---|
| B08B 13/00 | (2006.01) |
| B08B 1/14 | (2024.01) |
| B08B 1/50 | (2024.01) |
| B08B 6/00 | (2006.01) |
| B25J 11/00 | (2006.01) |

(52) U.S. Cl.
CPC .................. B08B 6/00 (2013.01); B08B 1/14 (2024.01); B08B 1/50 (2024.01); B25J 11/0085 (2013.01)

(58) Field of Classification Search
None
See application file for complete search history.

(56) References Cited

U.S. PATENT DOCUMENTS

| | | | |
|---|---|---|---|
| 2020/0093014 A1* | 3/2020 | Merenda ................ | B65H 75/48 |
| 2021/0402445 A1 | 12/2021 | Smith | |
| 2023/0245871 A1* | 8/2023 | Nagaike ........... | H01L 21/67196 134/1 |

FOREIGN PATENT DOCUMENTS

| | | |
|---|---|---|
| JP | H11-224895 A | 8/1999 |
| JP | 2016-039250 A | 3/2016 |

\* cited by examiner

*Primary Examiner* — Eric W Golightly
(74) *Attorney, Agent, or Firm* — METROLEX IP LAW GROUP, PLLC; Robert L. Scott, Esq.

(57)                ABSTRACT

A charging system according to this disclosure includes a particle absorption tool configured to be electrostatically charged so as to build up a static electric charge for absorbing particles; a charger configured to electrostatically charge the particle absorption tool so as to build up the static electric charge; and a charger container configured to accommodate the charger, arranged in a place where a FOUP for accommodating substrates is arranged, and having an opening that is opened toward an interior of a substrate conveyor.

14 Claims, 10 Drawing Sheets

500

X2 X1
X
Z1 Z
Z2
Y2 Y2
Y

CHARGING SYSTEM AND METHOD FOR CONTROLLING CHARGING SYSTEM

BACKGROUND OF THE INVENTION

Field of the Invention

The present disclosure relates to a charging system and a method for controlling a charging system.

Description of the Background Art

Tools for absorbing particles such as dust in semiconductor production apparatuses are known in the art. Japanese Patent Laid-Open Publication No. JP H11-224895 discloses a disk-shaped particle-removing tool configured to be electrostatically charged. In Japanese Patent Laid-Open Publication No. JP H11-224895, the disk-shaped particle-removing tool is held by a hand of a robot arm placed in a substrate conveyor similar to wafers. When the particle-removing tool comes in contact with the hand, and particles that cling to the hand are absorbed to the particle-removing tool brought in a charged state. As a result, the particles clinging to the hand can be removed from the hand.

Here, as stated in Japanese Patent Laid-Open Publication No. JP H11-224895, in a case in which particles cling to the hand are removed by using the particle-removing tool electrostatically brought in the charged state, the particle-removing tool is necessarily previously charged. Also, as stated in Japanese Patent Laid-Open Publication No. JP H11-224895, in a case in which the hand of the robot arm and the particle-removing tool are placed in the substrate conveyor, the substrate conveyor is necessarily temporarily opened to manually charge the particle-removing tool. However, if the substrate conveyor is even temporarily opened, particles such as dust will come into the substrate conveyor. For this reason, it is desired to charge such a particle-removing tool without opening a semiconductor production apparatus such as a substrate conveyor.

SUMMARY OF THE INVENTION

The disclosure invention is intended to solve the above problem, and one object of the present disclosure is to provide a charging system and a method for controlling a charging system capable of charging a particle-removing tool without opening a substrate conveyor.

A charging system according to a first aspect of the present disclosure includes a particle absorption tool configured to be electrostatically charged so as to build up a static electric charge for absorbing particles; a charger configured to electrostatically charge the particle absorption tool so as to build up the static electric charge; and a charger container configured to accommodate the charger, arranged in a place where a FOUP for accommodating substrates is arranged, and having an opening that is opened toward an interior of a substrate conveyor.

As discussed above, the charging system according to the first aspect of the present disclosure includes the charger configured to electrostatically charge the particle absorption tool so as to build up the static electric charge; and the charger container configured to accommodate the charger, arranged in a place where the FOUP for accommodating substrates in the substrate conveyor is arranged, and having an opening that is opened toward an interior of the substrate conveyor. According to this configuration, because the charger container has an opening opened toward the interior of the substrate conveyor, interior space of the charger container and interior space of the substrate conveyor are connected to each other. Accordingly, the particle absorption tool can be charged by the charger in the interior space of the charger container. Consequently, it is possible to charge the particle absorption tool without opening the substrate conveyor.

A method for controlling a charging system according to a second aspect of the present disclosure includes electrostatically charging a particle absorption tool configured to build up a static electric charge so as to absorb particles by using a charger accommodated in a charger container arranged in a place where a FOUP for accommodating substrates is arranged and having an opening that is opened toward an interior of a substrate conveyor; and absorbing the particles by using the particle absorption tool building up the static electric charge.

As discussed above, the method for controlling a charging system according to the second aspect of the present disclosure includes electrostatically charging the particle absorption tool configured to build up a static electric charge so as to absorb particles by using the charger accommodated in the charger container arranged in a place where the FOUP for accommodating substrates in the substrate conveyor is arranged and having an opening that is opened toward an interior of the substrate conveyor. According to this configuration, because the charger container has an opening opened toward the interior of the substrate conveyor, interior space of the charger container and interior space of the substrate conveyor are connected to each other. Accordingly, the particle absorption tool can be charged by the charger in the charger container. Consequently, it is possible to provide a method for controlling a charging system capable of charging the particle absorption tool without opening the substrate conveyor.

According to a substrate conveying system and a method for controlling a substrate conveying system of the present disclosure, it is possible to charge a particle absorption tool without opening a substrate conveyor.

DESCRIPTION OF THE PREFERRED EMBODIMENT

First Embodiment

The following description will describe a first embodiment embodying the present disclosure with reference to the drawings. In this specification, the upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

(Semiconductor Production Apparatus)

Figure 1:
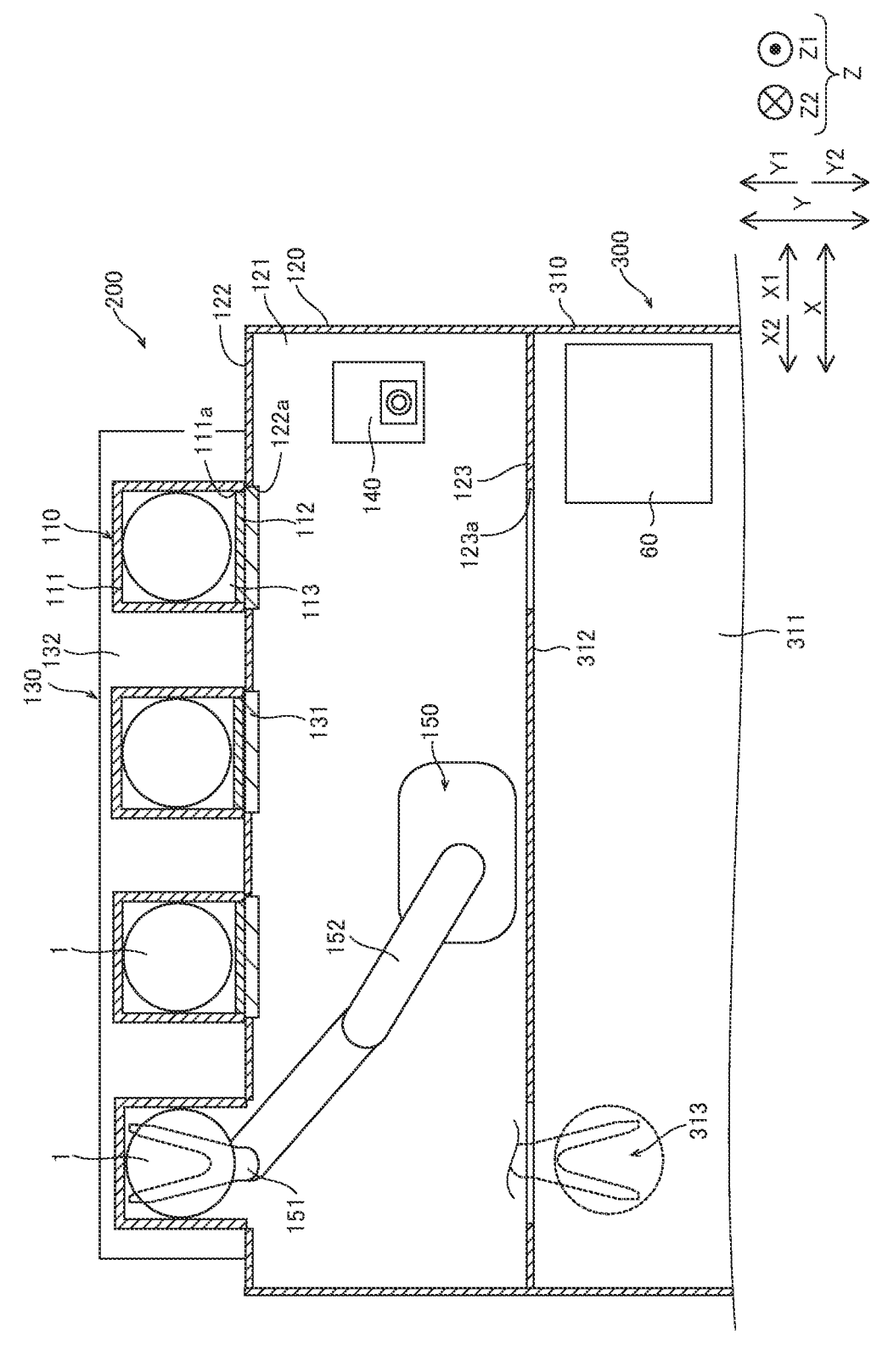
FIG. 1 is a view showing a semiconductor production apparatus according to a first embodiment.

The following description describes a semiconductor production apparatus 500. As shown in FIG. 1, the semiconductor production apparatus 500 is an apparatus for processing substrates 1 formed of a semiconductor such as wafers. The semiconductor production apparatus 500 includes a substrate conveyor 200 and a substrate processor 300. The semiconductor production apparatus 500 is placed a clean room, for example.

(Substrate Conveyor)

The following description describes the substrate conveyor 200. For example, the substrate conveyor 200 is an EFEM (Equipment Front End Module). The substrate conveyor 200 includes FOUPs 110, a housing 120, an FOUP opener 130, an aligner 140, a robot 150, and a controller 160 shown in FIG. 2.

(FOUP)

Each FOUP 110 contains a plurality of substrates 1 before and after processing. An interior of the FOUP 110 is maintained clean similar to the clean room. The FOUP 110 includes a housing 111 and an opening/closing part 112. The housing 111 has a box shape, and includes an opening 111a opened toward an interior of the substrate conveyor 200. The opening/closing part 112 is configured to cover the opening 111a of the housing 111. The number of FOUPs 110 is four, for example.

(Housing)

The housing 120 has interior space 121. The interior space 121 is filled with a highly clean atmospheric gas. A robot 150 is placed in the interior space 121 of the housing 120. The housing 120 has a rectangular shape, for example. The housing 120 includes a wall 122 on the Y1 side having an opening 122a through which interior space of the housing is connected to the interior space 113 of the FOUP 110. Each substrate 1 can be moved between the FOUP 110 and the substrate conveyor 200 through the opening 122a. The housing 120 includes a wall 123 on the Y2 side having an opening 123a through which interior space of the housing is connected to interior space 311 of the substrate processor 300. Each substrate 1 can be moved between the substrate processor 300 and the substrate conveyor 200 through the opening 123a.

The following description describes the FOUP opener 130. The FOUP opener 130 is placed on the Y1 side of the substrate conveyor 200. The FOUP opener 130 includes opening/closing parts 131 and an FOUP support 132. Each opening/closing part 131 is arranged on the opening 122a of the wall 122 on the Y1 side of the housing 120. An opening mechanism (not shown) opens the opening/closing part 131 of the FOUP opener 130 and the opening/closing part 112 of the FOUP 110 so that the interior space 113 of the FOUP 110 is connected to the interior space 121 of the housing 120.

The following description describes the aligner 140. The aligner 140 is configured to receive the substrate 1 on the aligner. The aligner 140 rotates the substrate 1 to align the substrate 1 so as to agree a notch or an orientation flat formed in the substrate 1 with a predetermined orientation. The aligner 140 is placed in the interior space 121 of the housing 120 of the substrate conveyor 200.

The following description describes the robot 150. The robot 150 is placed in the interior space 121 of the housing 120 of the substrate conveyor 200. The robot 150 is a horizontal multi-joint robot, for example. The robot 150 includes a hand 151 and a robot arm 152. The hand 151 is configured to hold the substrate 1. For example, the hand 151 has a Y shape forming a bifurcated distal end. The hand 151 is arranged on a distal end of the robot arm 152. The robot arm 152 includes a plurality of links.

Figures 2, 3:
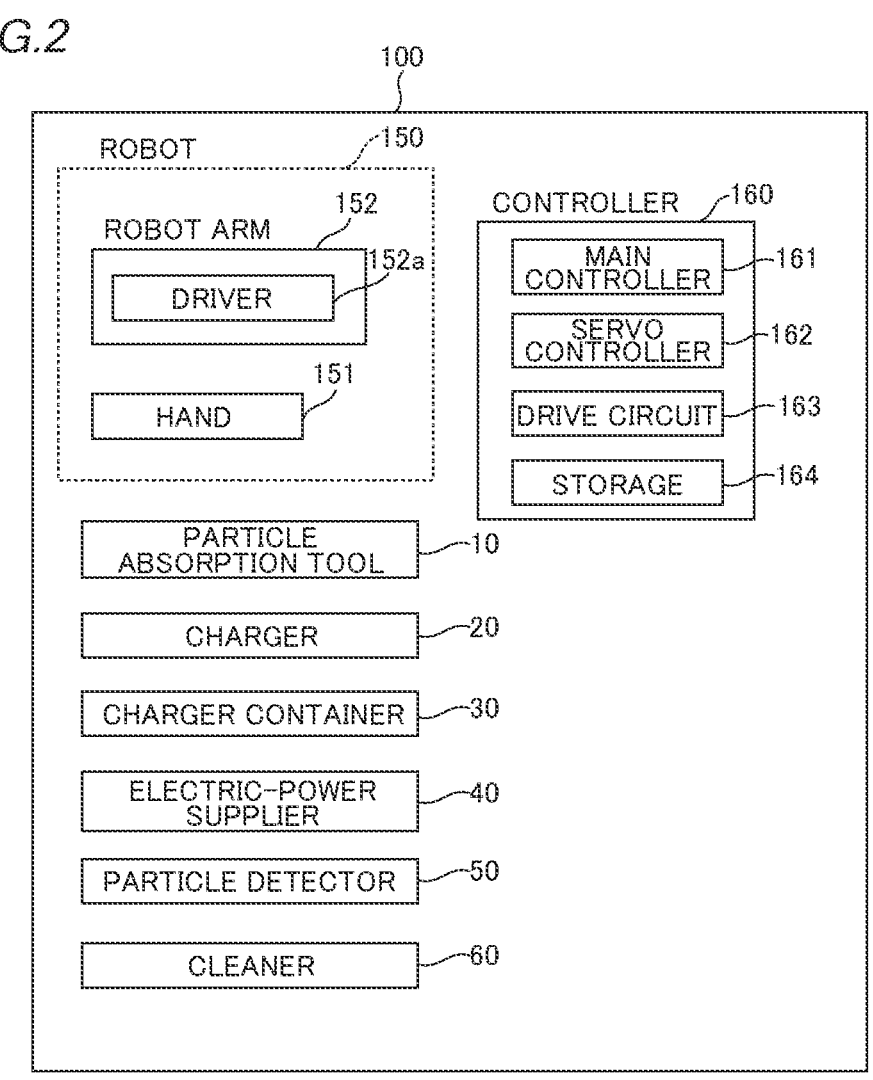
FIG. 2 is a block diagram showing a charging system according to the first embodiment.
FIG. 3 is a view showing a particle absorption tool according to the first embodiment.

The following description describes a configuration of the controller 160. The controller 160 is a robot controller. As shown in FIG. 2, the controller 160 includes a main controller 161, a servo controller 162, drive circuits 163, and a storage 164. The main controller 161 and the servo controller 162, for example, include a CPU (Central Processing Unit). The main controller 161 controls drivers 152a of the robot arm 152. The servo controller 162 controls electric power supplied to the drivers 152a of the robot arm 152 based on commands from the main controller 161. The drive circuits 163 supply driving power to the drivers 152a of the robot arm 152. Specifically, the robot arm 152 includes two or more drivers 152a, and each of the drive circuits 163 is provided for corresponding one of the drivers 152a of the robot arm 152. Alternatively, one common drive circuit 163 can be provided for the drivers 152a. Each driver 152a includes a servo motor, an encoder and a reduction gear. The storage 164 stores programs to be executed by the controller 160.

(Substrate Processor)

The following description describes the substrate processor 300. As shown in FIG. 1, the substrate processor 300 configured to apply processing to the substrate 1. For example, the substrate processor 300 can apply the processes such as thermal process, impurity introduction process, thin-film formation process, lithography process, cleaning process, and planarization process to the substrate 1. The substrate processor 300 is arranged adjacent to the substrate conveyor 200. The substrate processor 300 includes a housing 310 with interior space 311. A wall 312 on the Y1 side of the housing 310 of the substrate processor 300 is the same as the wall 123 on the Y2 side of the housing 120 of the substrate conveyor 200. A receiving part 313 on which the substrate 1 is placed is arranged in the interior space 311 of the substrate processor 300.

(Charging System)

The charging system 100 is a system for charging a particle absorption tool 10. As shown in FIG. 2, the charging system 100 includes the robot 150, the particle absorption tool 10, a charger 20, a charger container 30, an electric-power supplier 40, a particle detector 50, a cleaner 60, and the controller 160.

(Particle Absorption Tool)

Figure 4:
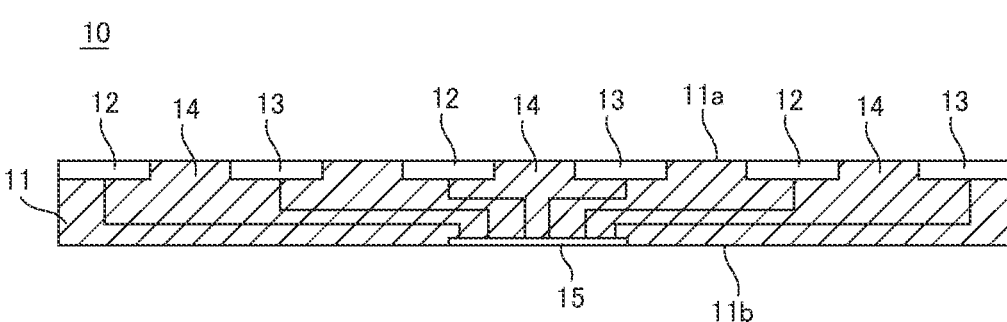
FIG. 4 is a cross-sectional view of the particle absorption tool taken along a line 1000-1000 in FIG. 3.

The following description describes the particle absorption tool 10. The particle absorption tool 10 can be held on the hand 151. Also, the particle absorption tool 10 is configured to be electrostatically charged so as to build up a static electric charge for absorbing particles. Also, as shown in FIG. 3, the particle absorption tool 10 has, for example, a disk shape, and has the same diameter as the substrate 1. Also, as shown in FIG. 4, the particle absorption tool 10 includes a semiconductor substrate 11, and anodes 12, cathodes 13, bias electrodes 14, and an interface 15, for example. The anodes 12 and the cathodes 13 are formed by impurity introduction. The anodes 12, the bias electrodes 14, and the cathodes 13 are arranged in this order on one surface 11a of the semiconductor substrate 11. The interface 15 is arranged on another surface 11b of the semiconductor substrate 11. The interface 15 is connected to the anodes 12 and the cathodes 13. A voltage is applied to the interface 15 from a voltage applier 22 of the charger 20 shown in FIG. 5. Accordingly, the voltage is applied to the anodes 12 and the cathodes 13 so that the one surface 11a of the semiconductor substrate 11 is charged.

(Charger)

Figure 5:
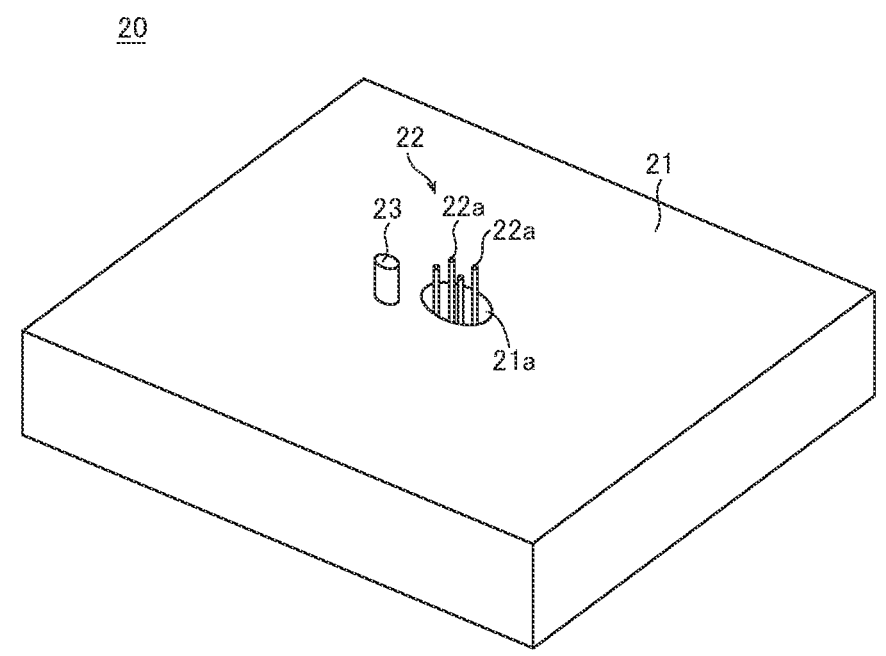
FIG. 5 is a view showing a charger according to the first embodiment.

The following description describes the charger 20. The charger 20 is a device configured to electrostatically charge the particle absorption tool 10 so as to build up the static electric charge. As shown in FIG. 5, the charger 20 includes a housing 21, the voltage applier 22, a contact detector 23, an electric-power storage 24 shown in FIG. 6, and a wireless electric-power-supplying coil 25 shown in FIG. 6. The housing 21 has a box shape. The housing 21 has a size capable of accommodating the charger container 30.

The voltage applier 22 is configured to contact the interface 15 of the particle absorption tool 10 and to apply a voltage to the particle absorption tool 10. For example, the voltage applier 22 contains a plurality of probes 22a. The plurality of probes 22a protrude outward from the housing 21 through a hole 21a of the housing 21. When the plurality of probes 22a come into contact with the interface 15 of the particle absorption tool 10, the voltage can be applied to the anodes 12 and the cathodes 13.

In the first embodiment, the contact detector 23 is configured to detect information on the contact of the voltage applier 22 with the particle absorption tool 10. The charger 20 is configured to start to apply the voltage to the particle absorption tool 10 through the voltage applier 22 in response to the detection of the information on the contact of the voltage applier 22 with the particle absorption tool 10 detected by the contact detector 23. The contact detector 23 is a contact-sensitive touch sensor. The contact detector 23 is arranged adjacent to the voltage applier 22. A protruding height of the contact detector 23 from the housing 21 is the same as the voltage applier 22. For example, when the particle absorption tool 10 held by the hand 151 comes into contact with the voltage applier 22, the particle absorption tool 10 comes into contact with the contact detector 23. In this case, the information on the contact of the voltage applier 22 with the particle absorption tool 10 is information on the contact of the particle absorption tool 10 with the contact detector 23. Subsequently, the charger 20 starts to apply the voltage to the particle absorption tool 10 through the voltage applier 22 in response to the detection of the contact of the voltage applier 22 with the particle absorption tool 10 detected by the contact detector 23. For example, a switch is connected between the electric-power storage 24 and the voltage applier 22, and the switch is turned on in response to the detection of the contact of the voltage applier 22 with the particle absorption tool 10 detected by the contact detector 23. As a result, a voltage can be applied from the electric-power storage 24 to the particle absorption tool 10 through the voltage applier 22.

Figure 6:
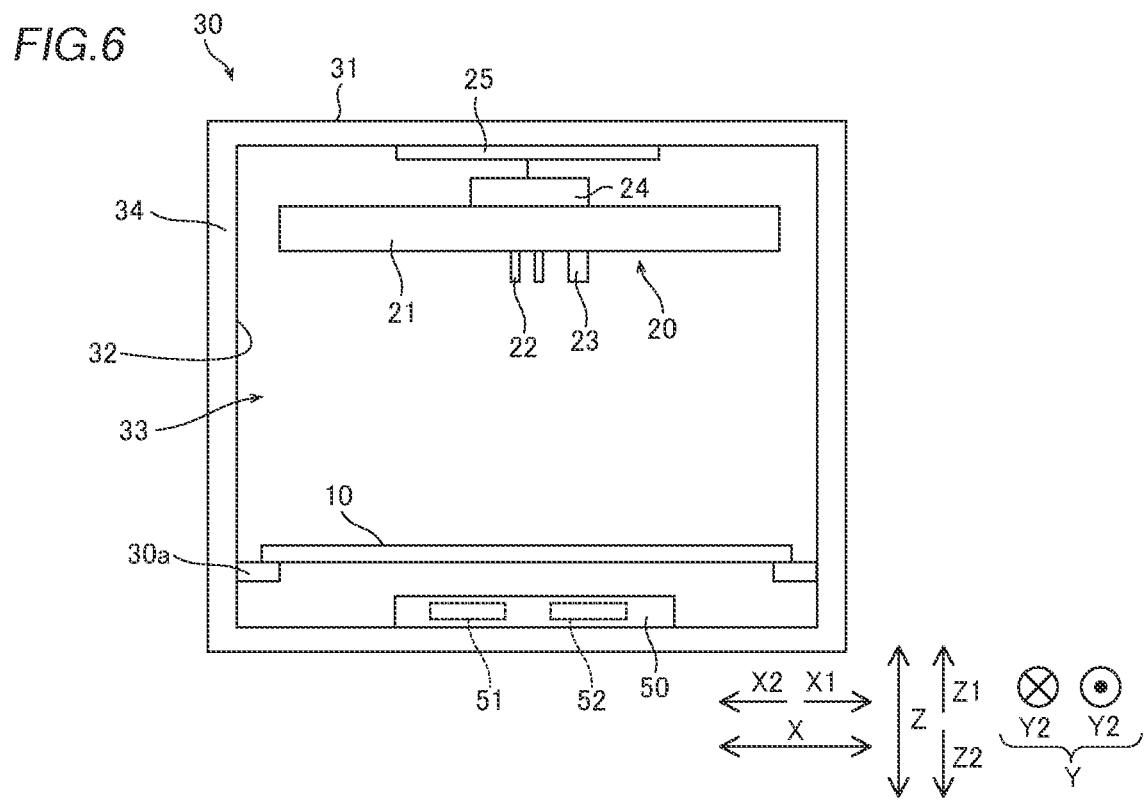
FIG. 6 is a view showing the charger accommodated in a charger container according to the first embodiment.

The electric-power storage 24 stores electric power to be supplied to the voltage applier 22. As shown in FIG. 6, the electric-power storage 24 is arranged outside the housing 21, for example. The wireless electric-power-supplying coil 25 is a coil for charging the electric-power storage 24. For example, the wireless electric-power-supplying coil 25 is arranged above the electric-power storage 24 and on an interior side of a top surface 31 of the charger container 30. The electric-power storage 24 and the wireless electric-power-supplying coil 25 are connected to each other.

(Charger Container)

Figure 7:
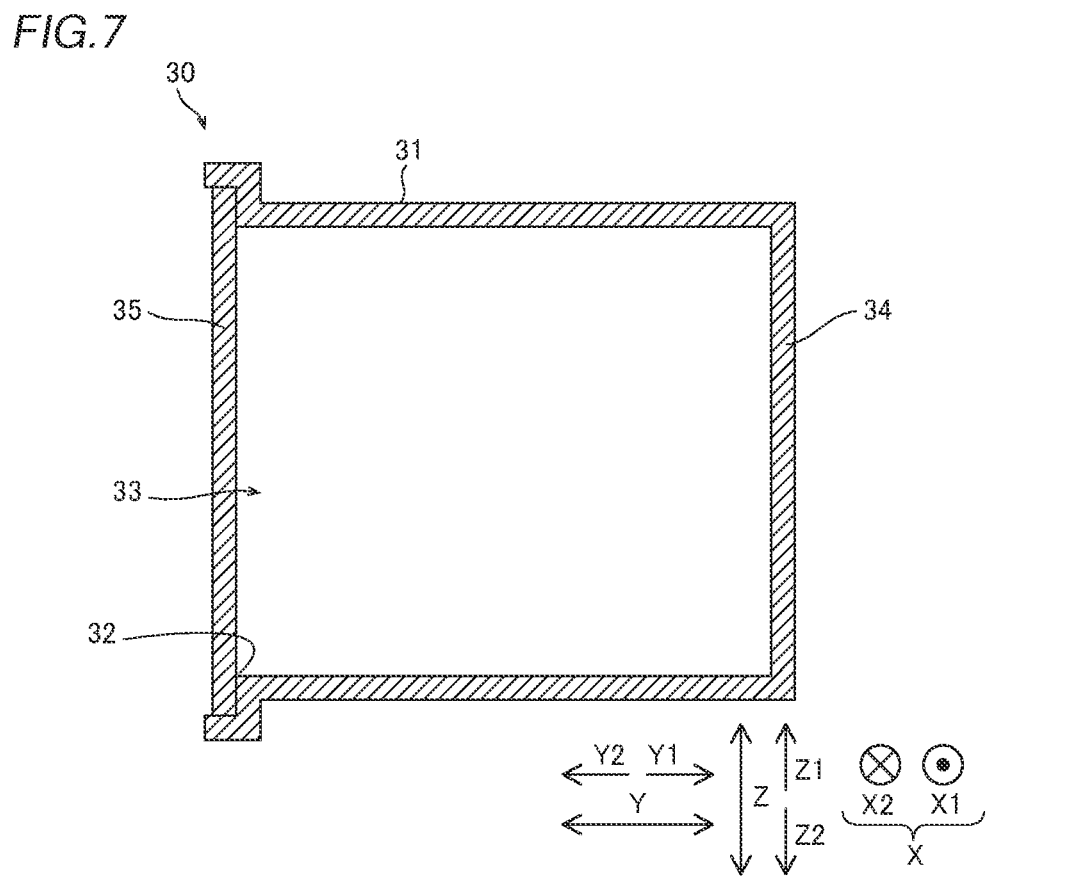
FIG. 7 shows a cross-sectional view showing the charger container according to the first embodiment as viewed from a side.
Figure 8:
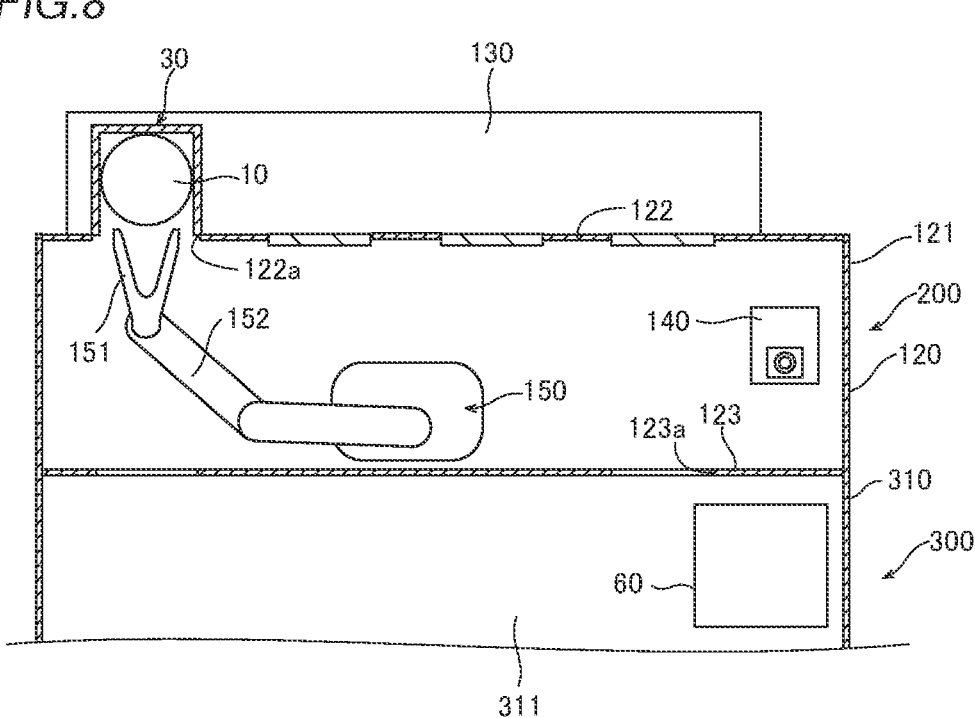
FIG. 8 is a view showing the semiconductor production apparatus with a hand going to hold the particle absorption tool.

The following description describes the charger container 30. In the first embodiment, the charger container 30 accommodates the charger 20. The charger container 30 is arranged in a place where the FOUP 110 for accommodating substrates 1 in the substrate conveyor 200 is arranged as shown in FIG. 8. The charger container 30 has an opening 32 that is opened toward the substrate conveyor 200. Specifically, the charger 20 is arranged in interior space 33 of the charger container 30. For example, the charger 20 is arranged at a relatively upper position in the interior space 33. In the first embodiment, the voltage applier 22 of the charger 20 is arranged inside the charger container 30, and faces downward. An interior of the charger container 30 is maintained clean in addition to the FOUP 110 similar to the clean room. The charger container 30 includes a housing 34, and an opening/closing part 35 shown in FIG. 7. The housing 34 has a box shape, and includes the opening 32 opened to the interior of the substrate conveyor 200. The opening/closing part 35 is configured to cover the opening 32 of the housing 34. As shown in FIG. 8, the charger container 30 is arranged in the FOUP opener 130 where the FOUP 110 is placed in the substrate conveyor 200. The opening/closing part 131 of the FOUP opener 130 and the opening/closing part 35 of the charger container 30 are opened to connect the interior space 33 of the charger container 30 to the interior space 121 of the housing 120. Accordingly, the particle absorption tool 10 can be moved between the charger container 30 and the substrate conveyor 200 through the opening 122a of the housing 120. Also, the particle absorption tool 10 can be moved between the substrate conveyor 200 and the substrate processor 300 through the opening 123a of the housing 120.

In the first embodiment, as shown in FIG. 8, an exterior shape of the charger container 30 is common to an exterior shape of the FOUP 110 so that the charger container 30 can accommodate the particle absorption tool 10. Specifically, the housing 34 of the charger container 30 shown in FIG. 6 and the housing 111 of the FOUP 110 shown in FIG. 1 have the same size. For this reason, the charger container 30 can be placed in the FOUP opener 130 instead of the FOUP 110. In addition, a diameter of the particle absorption tool 10 is the same as a diameter of the substrate 1. Accordingly, the particle absorption tool 10 can be accommodated in the charger container 30 similar to a case in which the substrate 1 is accommodated in the FOUP 110. In the first embodiment, as shown in FIG. 6, the charger container 30 accommodates the particle absorption tool 10. For example, the particle absorption tool 10 is supported by a support 30*a* of the charger container 30. An interior of the charger container 30 is maintained clean with the particle absorption tool 10 being accommodated in the charger container 30.

(Electric-Power Supplier)

Figure 9:
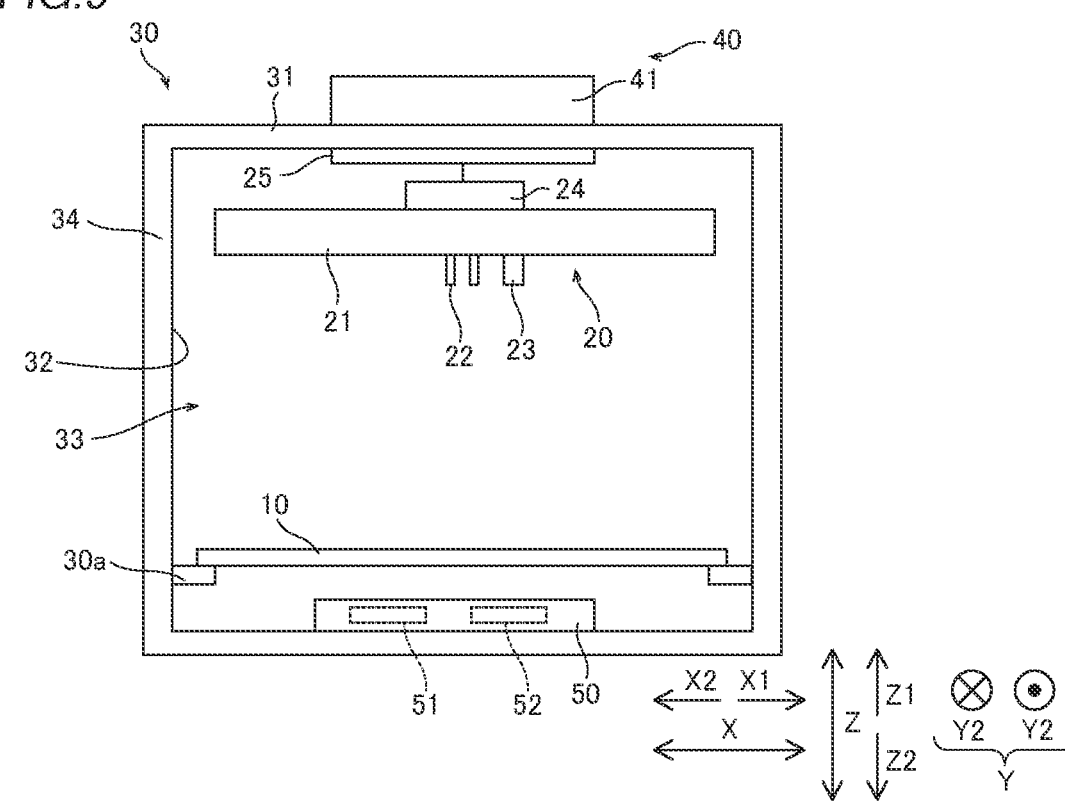
FIG. 9 is a view showing a charger in charging operation.

In the first embodiment, as shown in FIG. 9, the electric-power supplier 40 is arranged outside the charger container 30 and configured to wirelessly charge the electric-power storage 24. Specifically, the electric-power supplier 40 includes a wireless electric-power-supplying coil 41. The wireless electric-power-supplying coil 41 is supplied with electric power from an external source. The wireless electric-power-supplying coil 41 is arranged on the top surface 31 of the charger container 30. The electric-power storage 24 is charged with the power supplied to the wireless electric-power-supplying coil 41 through the wireless electric-power-supplying coil 25 of the electric-power storage 24.

(Particle Detector)

In the first embodiment, a particle detector 50 is provided to detect a degree of particle absorption by the particle absorption tool 10 during a series of operations of the robot arm 152. The series of operations of the robot arm 152 will be is described later. The particle detector 50 includes at least one of a charge-amount detector 51 configured to detect a charge amount of the particle absorption tool 10, and an image capturer 52 configured to capture an image of the particles that are absorbed by the particle absorption tool 10. The charge-amount detector 51 is a surface potentiometer, for example. The surface potentiometer can measure an amount of static electric charge by using electrostatic induction phenomenon in which an electric conductor is attracted by a charged object. The surface potentiometer can measure the amount of static electric charge without contact with the particle absorption tool 10. The particle detector 50 is arranged in the charger container 30. That is, the charger container 30 can accommodate both the particle absorption tool 10 and the particle detector 50. For example, the image capturer 52 is a high-resolution camera capable of capturing an image of particles.

In the first embodiment, the cleaner 60 configured to clean the particle absorption tool 10. As shown in FIG. 1, the cleaner 60 is arranged, for example, in the interior space 311 of the substrate processor 300. The substrate processor 300 is a spin dryer, for example. The spin dryer rotates the particle absorption tool 10 to remove particles adsorbed onto the particle absorption tool 10 by centrifugal force.

(Operation of Substrate Conveying System)

The following description describes operation of removal of particles inside the semiconductor production apparatus 500 executed by the substrate conveyor 200. The operation of the substrate conveyor 200 is controlled by the controller 160. As shown in FIG. 9, the electric-power storage 24 of the charger 20 is previously wirelessly charged by the electric-power supplier 40. Specifically, the particle absorption tool 10 is previously manually placed in the charger container 30. The electric-power storage 24 is charged by the wireless electric-power-supplying coil 41 of the electric-power supplier 40, which is arranged outside the charger container 30, through the wireless electric-power-supplying coil 25, which is arranged in the charger container 30. In other words, the electric-power storage 24 is charged while the interior of the charger container 30 is maintained clean with the particle absorption tool 10 being accommodated in the charger container 30. The substrate 1 is not processed by the semiconductor production apparatus 500 during the operation of removal of particles. As shown in FIG. 8, the charger container 30 is arranged instead of the FOUP 110 in the FOUP opener 130. One charger container 30 or a plurality of charger containers 30 can be provided in the FOUP opener 130. The following description describes an exemplary arrangement in which one charger container 30 is provided in the FOUP opener 130.

Figure 10:
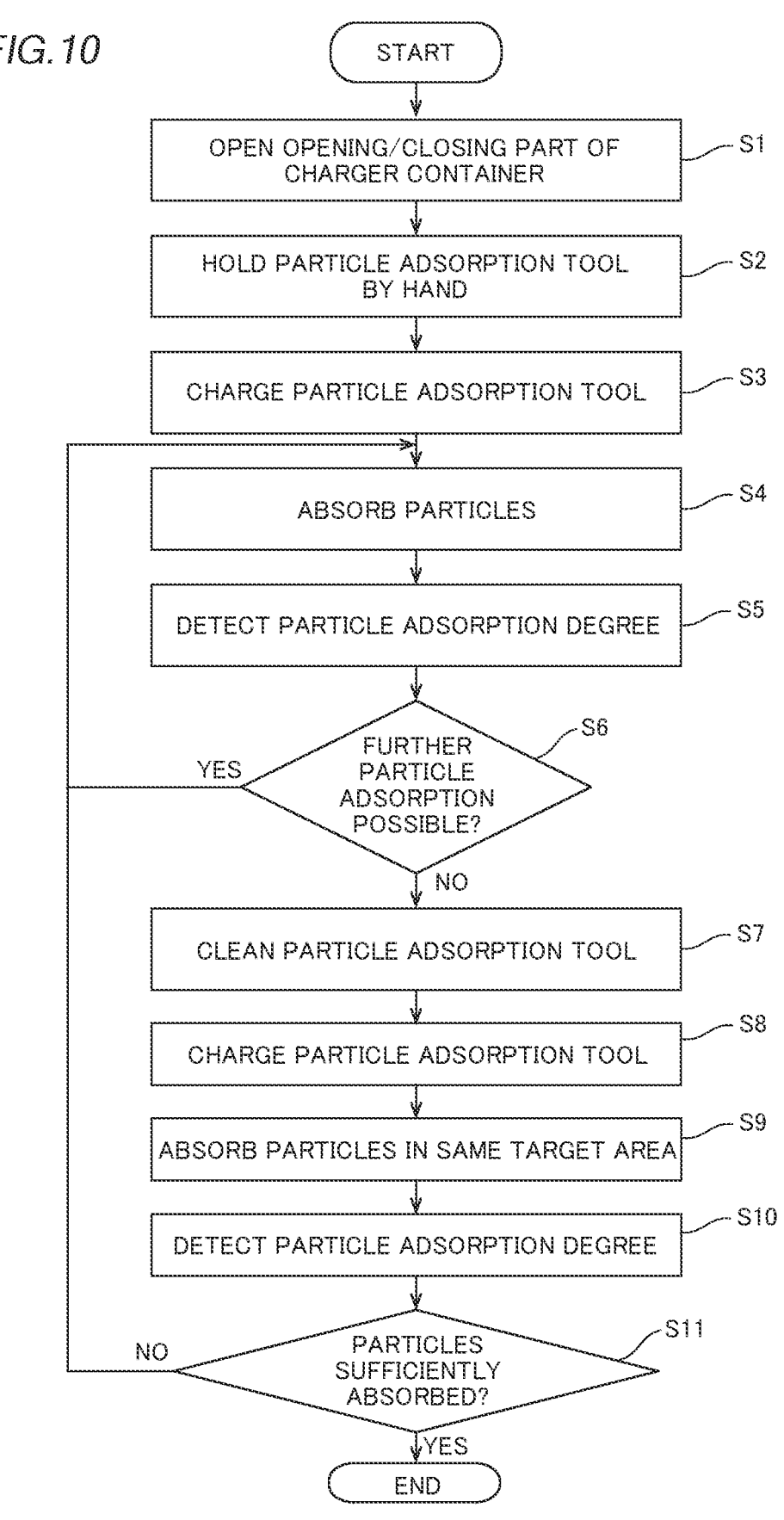
FIG. 10 is a flowchart illustrating a method for controlling the charging system according to the first embodiment.

As shown in FIG. 10, in step S1, the opening/closing part 131 of the FOUP opener 130 and the opening/closing part 35 of the charger container 30 are opened to connect the interior space 33 of the charger container 30 to the interior space 121 of the housing 120 of the substrate conveyor 200 by the controller 160 by moving the opening mechanism (not shown).

In step S2, as shown in FIG. 8, in the first embodiment, the controller 160 directs the hand 151 of the robot arm 152 to hold the particle absorption tool 10 previously accommodated in the charger container 30. Specifically, the controller 160 moves the hand 151 through the opening 122*a* of the housing 120 of the substrate conveyor 200 into the interior space 33 of the charger container 30.

Figure 11:
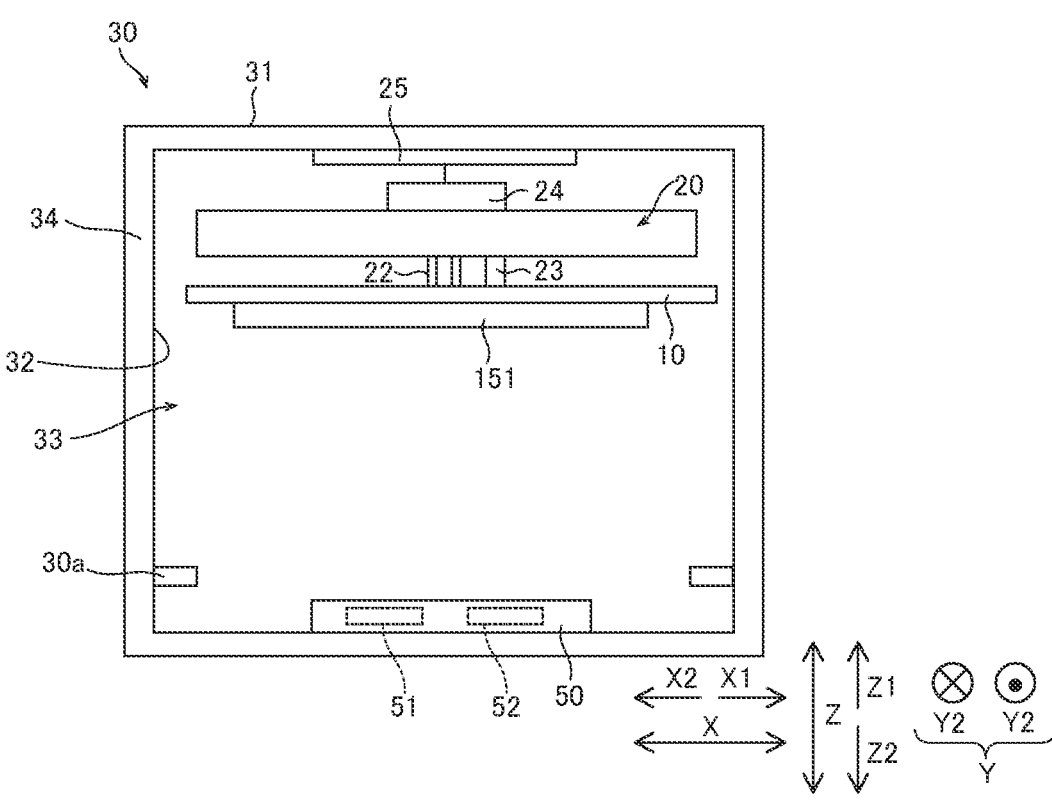
FIG. 11 is a view showing the particle absorption tool and a voltage applier of an electric-power storage brought in contact with each other by moving a robot arm.

In step S3, as shown in FIG. 11, in the first embodiment, the robot arm 152 is moved so as to bring the particle absorption tool 10 held by the hand 151 into contact with the voltage applier 22, and to charge the particle absorption tool 10 by the controller 160. Specifically, the controller 160 directs the robot arm 152 to move the particle absorption tool 10 held by the hand 151 upward to bring the particle absorption tool into contact with the voltage applier 22 so as to charge the particle absorption tool 10. At this time, the particle absorption tool 10 comes into contact with the contact detector 23 in addition to the voltage applier 22. Correspondingly, the charger 20 start to apply a voltage to the particle absorption tool 10 through the voltage applier 22. Here, the application of voltage to the particle absorption tool through the voltage applier 22 is not controlled by the controller 160 but executed by the charger 20.

Figure 12:
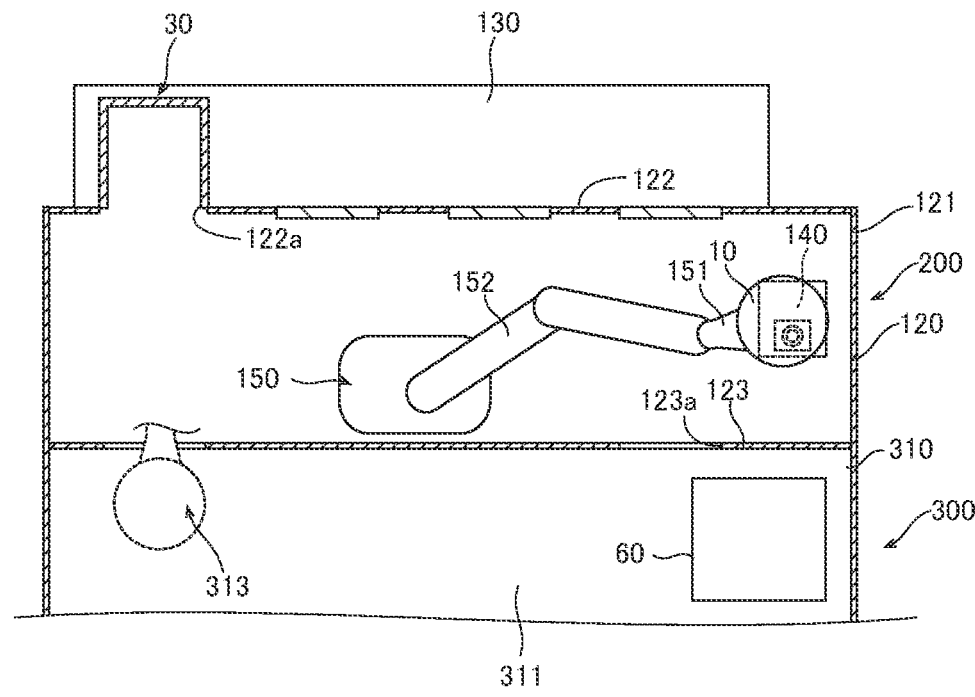
FIG. 12 is a view showing the semiconductor production apparatus in removal of particles on an aligner by using the particle absorption tool.

In step S4, in the first embodiment, after charging the particle absorption tool 10, the controller 160 moves the robot arm 152 and then absorbs particles in at least one of the interior of the substrate conveyor 200 and the interior of the substrate processor 300 by using the particle absorption tool 10 held by the hand 151. Specifically, the particle absorption tool 10 that has been accommodated in the charger container 30 is moved to the substrate conveyor 200 through the opening 122*a* of the housing 120 of the substrate conveyor 200, and the substrate processor 300 through the opening 123*a*. As shown in FIG. 12, the particle absorption tool 10 can absorb particles cling to a part of the aligner 140, which is arranged in the interior space 121 of the substrate conveyor 200, where the substrate 1 is placed, and the receiving part 313 on which the substrate 1 is placed in the interior space 311 of the substrate processor 300.

In step S5, in the first embodiment, the controller 160 detects a degree of particle absorption by the particle absorption tool 10 by using the particle detector 50. Specifically, the controller 160 temporarily moves the particle absorption tool 10 to the interior of the charger container 30. Subsequently, the controller 160 detects an amount of particles absorbed onto the particle absorption tool 10 by using the particle detector 50.

Then, in step S6, the controller 160 determines whether the particle absorption tool 10 can further absorb particles. In a case in which the particle detector 50 is the image capturer 52, the controller 160 detects the amount of absorbed particles based on an image of the particle absorption tool 10 captured by the image capturer 52 by using image processing or some other technique. If the amount of absorbed particles is not greater than a predetermined particle amount threshold, the controller 160 determines that the particle absorption tool 10 can further absorb particles, and the procedure returns to step S4. If the amount of absorbed particles is greater than the predetermined particle amount threshold, the controller 160 determines that the particle absorption tool 10 cannot further absorb particles, and the procedure goes to step S7. In a case in which the particle detector 50 is the charge-amount detector 51, the charge amount of the particle absorption tool 10 is detected by the charge-amount detector 51. If the charge amount of the particle absorption tool 10 detected by the charge-amount detector 51 is greater than a predetermined charge amount threshold, the controller 160 determines that the particle absorption tool 10 can further absorb particles, and the procedure returns to step S4. If the charge amount of the particle absorption tool 10 detected by the charge-amount detector 51 is not greater than the predetermined charge amount threshold, the controller 160 determines that the particle absorption tool 10 cannot further absorb particles, and the procedure goes to step S7. Accordingly, the degree of particle absorption is detected by the particle detector 50 during the series of operations in which particles are repeatedly absorbed in step S4.

Figures 13, 14:
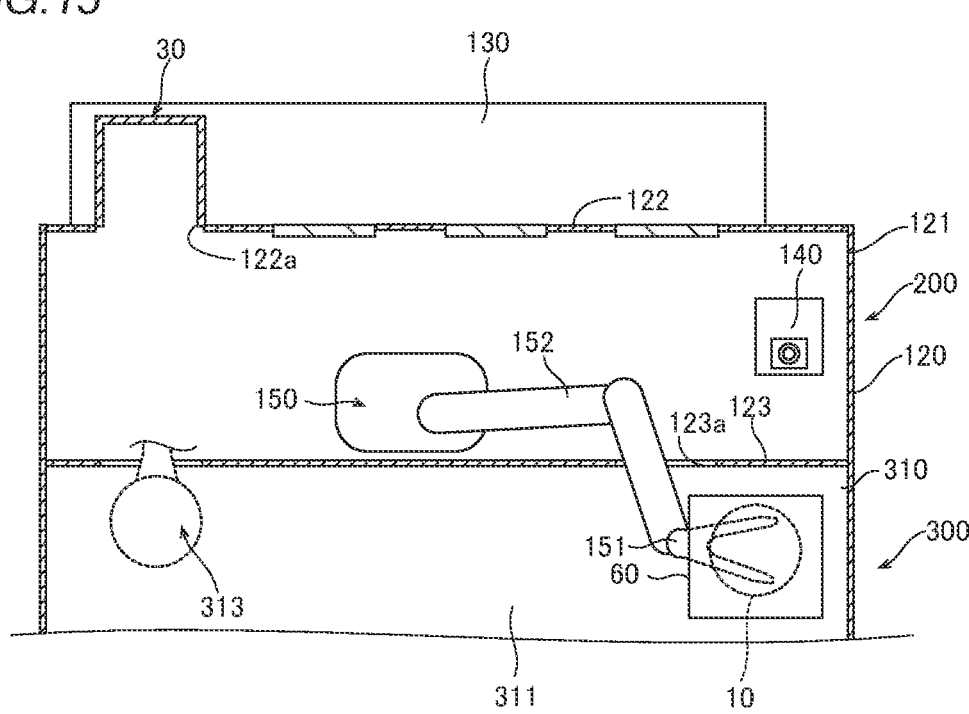
FIG. 13 is a view showing the semiconductor production apparatus in cleaning of the particle absorption tool by using a cleaner.
FIG. 14 is a view showing a charger accommodated in a charger container according to a second embodiment.

In step S7, as shown in FIG. 13, in the first embodiment, after absorbing particles by using the particle absorption tool 10, the controller 160 moves the robot arm 152 so as to move the particle absorption tool 10 to the cleaner 60. The cleaner 60 cleans the particle absorption tool 10 moved.

Subsequently, in step S8, the controller 160 electrostatically charges the particle absorption tool 10 so as to build up the static electric charge by using the charger 20 similar to step S3. Subsequently, in step S9, the controller 160 absorbs particles in the same target area as step S4 in order to confirm whether the particles is completely absorbed in the target area for absorption of particles in at least one of the interior of the substrate conveyor 200 and the interior of the substrate processor 300. In step S9, the controller 160 also execute the absorption operation by moving the particle absorption tool 10 in the target area when absorbing particles similar to step S4. For example, the controller 160 executes the absorption operation by conveying the particle absorption tool 10 held by the hand 151 to the substrate receiving part 313 of the substrate processor 300 as the target area for absorption of particles, and by placing the particle absorption tool 10 on the substrate receiving part 313 similar to step S4.

Subsequently, in step S10, the controller 160 detects the degree of particle absorption by the particle absorption tool 10 by using the particle detector 50 similar to step S5. Subsequently, in step S11, it is determined whether particles in the target area are sufficiently absorbed. For example, in a case in which the particle detector 50 is the image capturer 52, the controller 160 detects the amount of absorbed particles based on an image of the particle absorption tool 10 captured by the image capturer 52 similar to step S6. If the amount of absorbed particles is greater than the predetermined particle amount threshold, the controller 160 determines that the particles are insufficiently absorbed, and the procedure returns to step S4. If the amount of absorbed particles is not greater than the predetermined particle amount threshold, the controller 160 determines that the particles are sufficiently absorbed. If it is determined that the particles are sufficiently absorbed, the operation of removal of particles inside the semiconductor production apparatus 500 executed by the substrate conveyor 200 ends.

The predetermined particle amount threshold in step S11 can be a value different from that in step S6.

Alternatively, in step S11, it can be determined whether particles in the target area are sufficiently absorbed based on a detection result of the charge-amount detector 51. In this case, the charge amount of the particle absorption tool 10 is detected by the charge-amount detector 51. If the charge amount of the particle absorption tool 10 detected by the charge-amount detector 51 is not greater than the predetermined charge amount threshold, the controller 160 determines that the charge amount was decreased by absorbing the particles in the same target area, and determines that the particles are detected. In this case, the controller determines that the particles are insufficiently absorbed, and the procedure returns to step S4. If the charge amount of the particle absorption tool 10 detected by the charge-amount detector 51 is greater than the predetermined charge amount threshold, the controller 160 determines that particles are not additionally absorbed so that the particles are sufficiently absorbed, and the control procedure ends.

In a case in which a plurality of target areas for absorption of particles are specified, processes from step S8 to step S11 can be executed for each of the plurality of target areas to determine whether particles are completely absorbed for each of the plurality of target areas.

Advantages of First Embodiment

The charging system 100 includes the charger 20 configured to electrostatically charge the particle absorption tool 10 so as to build up the static electric charge; and the charger container 30 configured to accommodate the charger 20, arranged in a place where the FOUP 110 for accommodating substrates 1 in the substrate conveyor 200 is arranged, and having an opening 32 that is opened toward an interior of the substrate conveyor 200. According to this configuration, because the charger container 30 has the opening 32 opened toward the interior of the substrate conveyor 200, interior space 33 of the charger container 30 and interior space 121 of the substrate conveyor 200 are connected to each other. Accordingly, the particle absorption tool 10 can be charged by the charger 20 in the interior space 33 of the charger container 30. Consequently, it is possible to charge the particle absorption tool 10 without opening the substrate conveyor 200.

An exterior shape of the charger container 30 is common to an exterior shape of the FOUP 110 so that the charger container 30 can accommodate the particle absorption tool 10. Because the exterior shape of the charger container 30 is the same as the exterior shape of the FOUP 110, the charger container 30 for accommodating the particle absorption tool 10 can be easily arranged in a place where the FOUP 110 in the substrate conveyor 200 is arranged.

The charger 20 includes the electric-power storage 24 configured to store electric power; and the charging system 100 further includes the electric-power supplier 40 arranged outside the charger container 30 and configured to wirelessly charge the electric-power storage 24. Because the electric-power storage 24 can be wirelessly charged from the outside of the charger container 30 without opening the charger container 30, it is possible to prevent dust and other particles from entering the charger container 30.

The charger 20 includes the voltage applier 22 configured to contact the particle absorption tool 10 and to apply a voltage to the particle absorption tool 10. The charging system 100 includes the robot arm 152, the hand 151 attached to the robot arm 152 and configured to hold the particle absorption tool 10, a controller 160 configured to direct the hand 151 of the robot arm 152 to hold the particle absorption tool 10, and to direct the robot arm 152 to move to bring the particle absorption tool 10 held by the hand 151 into contact with the voltage applier 22 so as to charge the particle absorption tool 10. Because the particle absorption tool 10 can be charged by movement of the robot arm 152 without manual intervention, it is possible to save labor of operators.

The charger 20 includes a contact detector 23 configured to detect information on the contact of the voltage applier 22 with the particle absorption tool 10. The charger 20 is configured to start to apply the voltage to the particle absorption tool 10 through the voltage applier 22 in response to the detection of the information on the contact of the voltage applier 22 with the particle absorption tool 10 detected by the contact detector 23. Because the controller 160 does not required to control application of a voltage to the particle absorption tool 10 through the voltage applier 22, it is possible to reduce a control load of the controller 160.

The voltage applier 22 is arranged inside the charger container 30, and faces downward; and the controller 160 directs the robot arm 152 to move the particle absorption tool 10 held by the hand 151 upward to bring the particle absorption tool into contact with the voltage applier 22 so as to charge the particle absorption tool 10. Accordingly, the particle absorption tool 10 can be easily charged simply by moving the particle absorption tool 10 upward by using the robot arm 152.

The charger container 30 previously accommodates the particle absorption tool 10; and the controller 160 is configured to direct the robot arm 152 to move and to direct the hand 151 to hold the particle absorption tool 10, which is previously accommodated in the charger container 30, and to then direct the robot arm to move to bring the particle absorption tool 10 held by the hand 151 into contact with the voltage applier 22. Accordingly, because the particle absorption tool 10 is not necessarily moved into the interior of the charger container 30, which accommodates the charger 20, operations of the robot arm 152 can be simplified.

The controller 160 is configured to, after bringing the particle absorption tool 10 held by the hand 151 into contact with the voltage applier 22 and charging the particle absorption tool 10, to move the robot arm 152 and to then absorb particles in at least one of the interior of the substrate conveyor 200 and an interior of the substrate processor 300 by using the particle absorption tool 10 held by the hand 151. Accordingly, particles can be absorbed by the particle absorption tool 10 that is sufficiently charged.

The charging system 100 includes the particle detector 50 configured to detect a degree of particle absorption by the particle absorption tool 10 during a series of operations of the robot arm 152. Accordingly, because the controller 160 determines whether the particle absorption tool 10 can further absorb particles based on the detection result obtained by the particle detector 50, it is possible to prevent that ineffective absorption operation, which uses the particle absorption tool 10 that cannot absorb particles, continues.

The particle detector 50 includes at least one of a charge-amount detector 51 configured to detect a charge amount of the particle absorption tool 10, and an image capturer 52 configured to capture an image of the particles that are absorbed by the particle absorption tool 10. Accordingly, because the charge-amount detector 51 can detect that the charge amount of the particle absorption tool 10 is relatively large, the controller 160 can determine whether the particle absorption tool 10 can further absorb particles. Also, because it can be detected that an amount of particles adhered onto the particle absorption tool 10 is relatively small based on an image of the particles, which are adhered onto the particle absorption tool 10, captured by the image capturer 52, the controller 160 can determine whether the particle absorption tool 10 can further absorb particles.

The particle detector 50 is arranged in the charger container 30. Accordingly, it is possible to prevent increase of a size of the charging system 100 as compared with a case in which the detection of a degree of particle absorption and the charging of the particle absorption tool 10 are executed in separate places.

The charging system 100 includes the cleaner 60 configured to clean the particle absorption tool 10. After absorbing particles by using the particle absorption tool 10, the controller 160 moves the robot arm 152 so as to move the particle absorption tool 10 to the cleaner 60; and the cleaner 60 cleans the particle absorption tool 10 moved. Accordingly, because the particle absorption tool 10 onto which particles are adhered can be cleaned, the cleaned particle absorption tool 10 can be charged and used in the next particle absorption operation. Consequently, it is not necessary to prepare a plurality of particle absorption tools 10.

Second Embodiment

The following description describes a charger container 630 according to a second embodiment of this disclosure.

Figure 15:
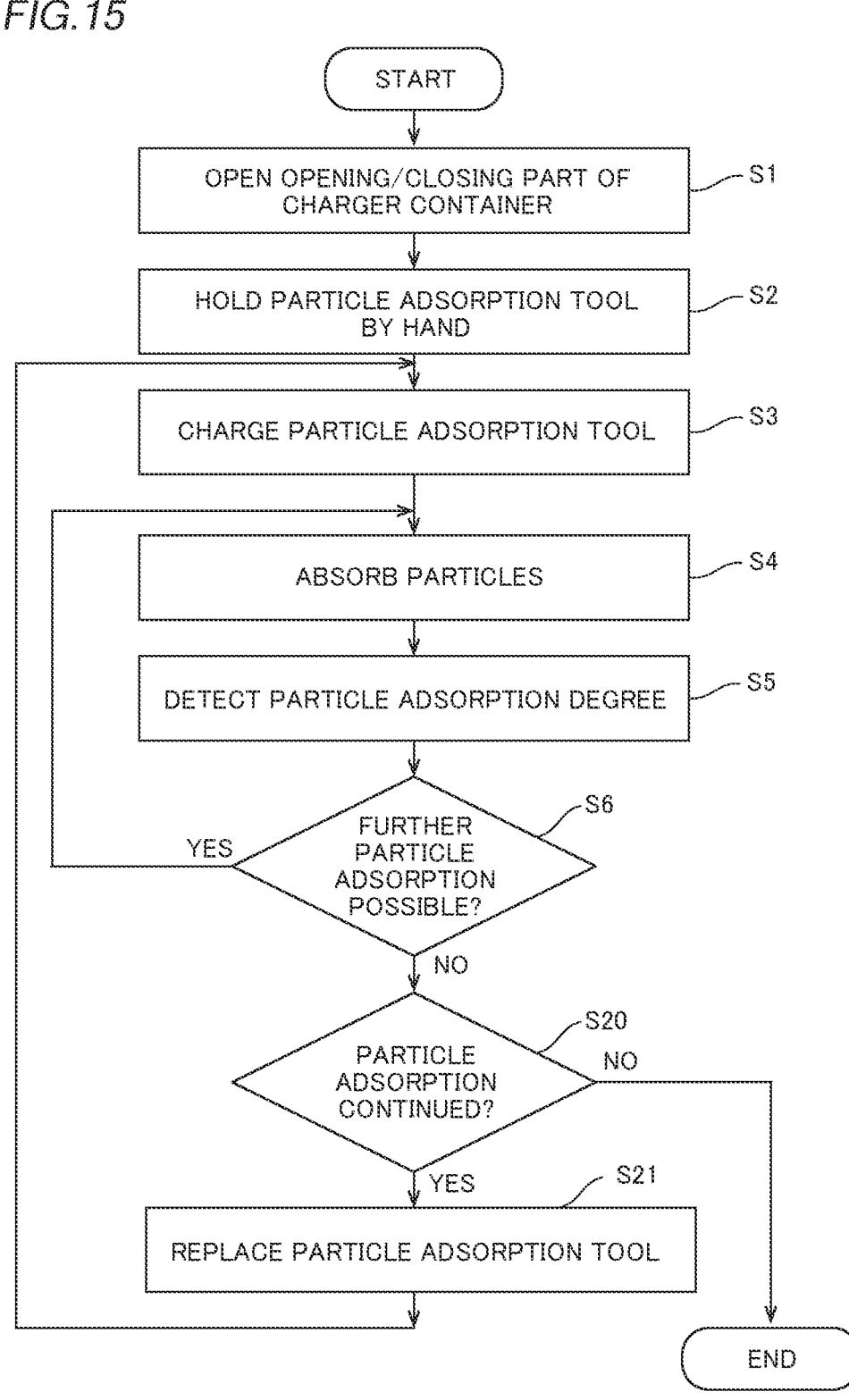
FIG. 15 is a flowchart illustrating a method for controlling a charging system according to the second embodiment.

In the second embodiment, as shown in FIG. 14, the charger container 630 previously accommodates a plurality of particle absorption tools 10. The controller 160 is configured to sequentially change the plurality of particle absorption tools 10 from one after another so as to absorb particles in at least one of an interior of a substrate conveyor 200 and an interior of a substrate processor 300. Specifically, a plurality of supports 631 configured to support the particle absorption tools 10 are placed in an interior of the charger container 630. The plurality of particle absorption tools 10 are placed on the supports 631. For example, in step S6, as shown in FIG. 15, if determining that the particle absorption tool 10 cannot further absorb particles, the controller 160 determines whether to continue operation of absorption of particles in step S20. If continuing particle absorption, the procedure goes to step S21 in which the controller 160 replaces the particle absorption tool 10 that has been held to another particle absorption tool 10. Subsequently, the procedure repeats steps S3 to S6 shown in FIG. 15. If no in step S20, the controller 160 ends the particle removal operation.

Advantages of Second Embodiment

The charger container 630 previously accommodates the plurality of particle absorption tools 10; and the controller 160 is configured to sequentially change the plurality of particle absorption tools 10 from one after another so as to absorb particles in at least one of an interior of a substrate conveyor 200 and an interior of a substrate processor 300. Accordingly, even in a case in which the cleaner 60 configured to clean the particle absorption tool 10 is not provided, particles can be absorbed while sequentially changing the plurality of particle absorption tools 10 from one after another.

Modified Embodiments

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which an exterior shape of the charger container 30 is common to an exterior shape of the FOUP 110 has been shown in the aforementioned first and second embodiments, the present disclosure is not limited to this. For example, alternatively, the charger container 30 can have an exterior shape different from an exterior shape of the FOUP 110 as long as the charger container 30 can be placed in the substrate conveyor 200.

While the example in which the particle absorption tool 10 is accommodated in the charger container 30 has been shown in the aforementioned first and second embodiments, the present disclosure is not limited to this. For example, alternatively, the particle absorption tool 10 can be accommodated not in the charger container 30 but in the substrate conveyor 200 or the substrate processor 300.

While the example in which the charger 20 is wirelessly charged has been shown in the aforementioned first and second embodiments, the present disclosure is not limited to this. For example, alternatively, the charger 20 can be manually connected to a commercial power supply to charge the charger 20. After charged, the charger 20 can be accommodated in the charger container 30.

While the example in which the particle absorption tool 10 is moved by the robot arm 152 to the charger 20 and is charged by the charger has been shown in the aforementioned first and second embodiments, the present disclosure is not limited to this. For example, a lift configured to lift the particle absorption tool 10 can be arranged in the charger container 30 so that the particle absorption tool 10 lifted by the lift can be charged by the charger 20.

While the example in which the voltage applier 22 of the charger 20 faces downward has been shown in the aforementioned first and second embodiments, the present disclosure is not limited to this. For example, alternatively, the voltage applier 22 of the charger 20 faces upward.

While the example in which the charging system 100 includes the particle detector 50 has been shown in the aforementioned first and second embodiments, the present disclosure is not limited to this. For example, alternatively, the charging system 100 can have no particle detector 50. In this case, for example, if one cycle of particle absorption operations of the particle absorption tool 10 ends, the cycle of particle absorption operations is completed.

While the example in which the particle detector 50 is arranged in the charger container 30 has been shown in the aforementioned first and second embodiments, the present disclosure is not limited to this. For example, alternatively, the particle detector 50 can be arranged in a place other than the charger container 30, such as in the substrate conveyor 200 or the substrate processor 300.

While the example in which the cleaner 60 is arranged in the substrate processor 300 has been shown in the aforementioned first and second embodiments, the present disclosure is not limited to this. For example, alternatively, the cleaner 60 can be arranged in the substrate conveyor 200.

While the example in which the charger 20 is configured to start to apply the voltage to the particle absorption tool 10 through the voltage applier 22 in response to the detection of the information on the contact of the voltage applier 22 with the particle absorption tool 10 detected by the contact detector 23 has been shown in the aforementioned first and second embodiments, the present disclosure is not limited to this. For example, alternatively, the controller 160 can be configured to start to apply the voltage to the particle absorption tool 10 through the voltage applier 22 in response to the detection of the information on the contact of the voltage applier 22 with the particle absorption tool 10 detected by the contact detector 23.

While the example in which the particle removal operation ends after the particle absorption tool 10 is cleaned by the cleaner 60 has been shown in the aforementioned first embodiment, the present disclosure is not limited to this. For example, alternatively, after the particle absorption tool 10 is cleaned by the cleaner 60, the charger 20 can recharge the particle absorption tool 10 and restart the particle removal operation.

Figure 16:
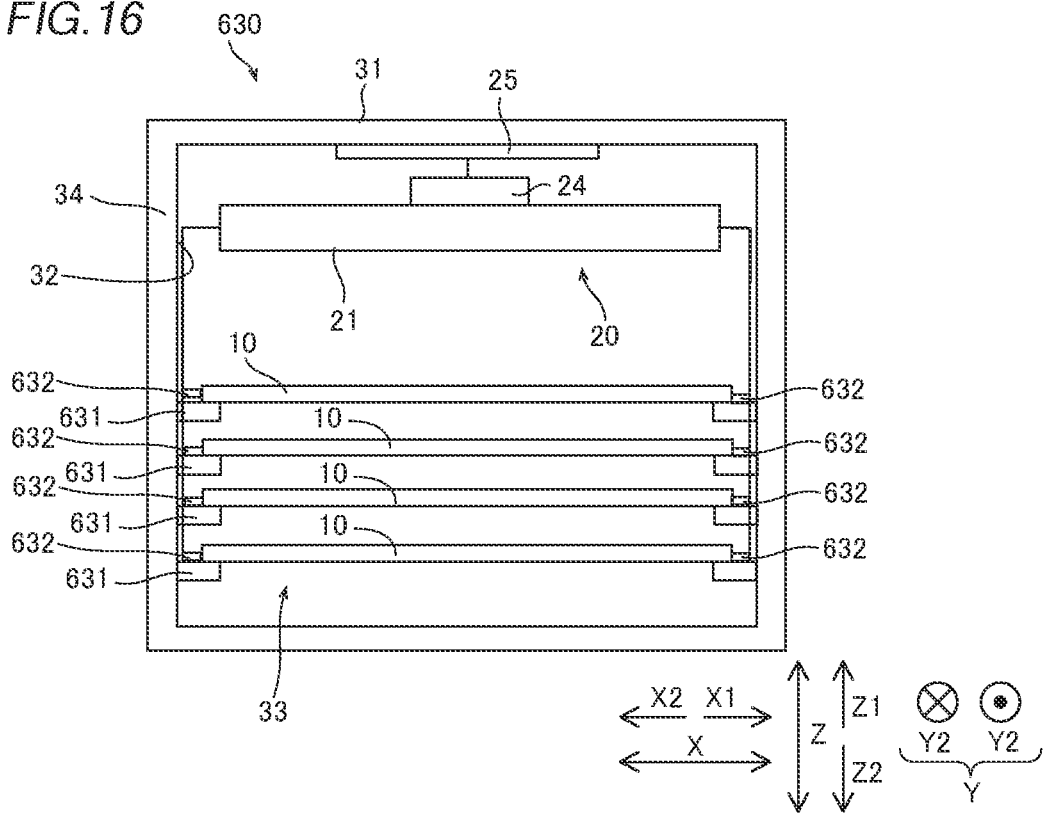
FIG. 16 is a view showing a charger accommodated in a charger container according to a modified embodiment.

While the example in which a plurality of particle absorption tools 10 and a voltage applier 22 configured to charge one particle absorption tool 10 are arranged in the charger container 630 has been shown in the aforementioned second embodiment, the present disclosure is not limited to this. In this disclosure, alternatively, as shown in FIG. 16, a voltage applier 632 configured to simultaneously apply a voltage to a plurality of particle absorption tools 10 can be arranged in the charger container 630. For example, a set of voltage appliers 63 is arranged on each of the plurality of supports 631. The particle absorption tool 10 is placed between the voltage appliers 632 of each set, and is charged by the voltage appliers 632. According to this configuration, because the plurality of particle absorption tools 10 can be simultaneously charged, time required to charge the plurality of particle absorption tools 10 can be reduced.

Functions of elements disclosed in this specification can be realized by a circuit or processing circuit including a general purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

Modes

The aforementioned exemplary embodiment will be understood as concrete examples of the following modes by those skilled in the art.

(Mode 1)

A charging system includes a particle absorption tool configured to be electrostatically charged so as to build up a static electric charge for absorbing particles; a charger configured to electrostatically charge the particle absorption tool so as to build up the static electric charge; and a charger container configured to accommodate the charger, arranged in a place where a FOUP for accommodating substrates is arranged, and having an opening that is opened toward an interior of a substrate conveyor.

(Mode 2)

In the charging system according to mode 1, an exterior shape of the charger container is common to an exterior shape of the FOUP; and the charger container is configured to be able to accommodate the particle absorption tool.

(Mode 3)

In the charging system according to mode 1 or 2, the charger includes an electric-power storage configured to store electric power; and an electric-power supplier arranged outside the charger container and configured to wirelessly charge the electric-power storage is further provided.

(Mode 4)

In the charging system according to any of modes 1 to 3, the charger includes a voltage applier configured to contact the particle absorption tool and to apply a voltage to the particle absorption tool; and a robot arm; a hand attached to the robot arm and configured to hold the particle absorption tool, a controller configured to direct the hand of the robot arm to hold the particle absorption tool, and to direct the robot arm to move to bring the particle absorption tool held by the hand into contact with the voltage applier so as to charge the particle absorption tool.

(Mode 5)

In the charging system according to mode 4, the charger includes a contact detector configured to detect information on the contact of the voltage applier with the particle absorption tool, and the charger is configured to start to apply the voltage to the particle absorption tool through the voltage applier in response to the detection of the information on the contact of the voltage applier with the particle absorption tool detected by the contact detector.

(Mode 6)

In the charging system according to mode 4 or 5, the voltage applier is arranged inside the charger container, and faces downward; and the controller is configured to direct the robot arm to move the particle absorption tool held by the hand upward to bring the particle absorption tool held by the hand into contact with the voltage applier so as to charge the particle absorption tool.

(Mode 7)

In the charging system according to any of modes 4 to 6, the charger container previously accommodates the particle absorption tool; and the controller is configured to direct the robot arm to move and to direct the hand to hold the particle absorption tool, which is previously accommodated in the charger container, and to then direct the robot arm to move to bring the particle absorption tool held by the hand into contact with the voltage applier.

(Mode 8)

In the charging system according to mode 7, the controller is configured to, after bringing the particle absorption tool held by the hand into contact with the voltage applier and charging the particle absorption tool, to move the robot arm and to then absorb particles in at least one of the interior of the substrate conveyor and an interior of a substrate processor by using the particle absorption tool held by the hand.

(Mode 9)

In the charging system according to mode 8, a particle detector configured to detect a degree of particle absorption by the particle absorption tool during a series of operations of the robot arm is further provided.

(Mode 10)

In the charging system according to mode 9, the particle detector includes at least one of a charge-amount detector configured to detect a charge amount of the particle absorption tool, and an image capturer configured to capture an image of the particles that are absorbed by the particle absorption tool.

(Mode 11)

In the charging system according to mode 9 or 10, the particle detector is arranged in the charger container.

(Mode 12)

In the charging system according to any of modes 8 to 11, a cleaner configured to clean the particle absorption tool is further provided; the controller is configured to, after absorbing particles by using the particle absorption tool, move the robot arm so as to move the particle absorption tool to the cleaner; and the cleaner is configured to clean the particle absorption tool moved.

(Mode 13)

In the charging system according to any of modes 4 to 12, the charger container previously accommodates a plurality of particle absorption tools as the particle absorption tool; and the controller is configured to sequentially change the plurality of particle absorption tools from one after another so as to absorb particles in at least one of the interior of the substrate conveyor and an interior of a substrate processor.

(Mode 14)

In the charging system according to any of modes 1 to 3, the charger includes a voltage applier configured to contact the particle absorption tool and to apply a voltage to the particle absorption tool; the charger container previously accommodates a plurality of particle absorption tools as the particle absorption tool; and the voltage applier is configured to simultaneously apply the voltage to the plurality of particle absorption tools.

(Mode 15)

A method for controlling a charging system includes electrostatically charging a particle absorption tool configured to build up a static electric charge so as to absorb particles by using a charger accommodated in a charger container arranged in a place where a FOUP for accommodating substrates is arranged and having an opening that is opened toward an interior of a substrate conveyor; and absorbing the particles by using the particle absorption tool building up the static electric charge.

What is claimed is:

1. A charging system comprising:

a particle absorption tool configured to be electrostatically charged so as to build up a static electric charge for absorbing particles;

a charger configured to electrostatically charge the particle absorption tool so as to build up the static electric charge; and a charger container configured to accommodate the charger, arranged in a place where a FOUP for accommodating substrates is arranged, and having an opening that is opened toward an interior of a substrate conveyor, wherein the charger includes a voltage applier configured to contact the particle absorption tool and to apply a voltage to the particle absorption tool; and the charging system further comprises a robot arm, a hand attached to the robot arm and configured to hold the particle absorption tool, and a controller configured to perform operations comprising operations to: direct the hand of the robot arm to hold the particle absorption tool; and to direct the robot arm to move to bring the particle absorption tool held by the hand into contact with the voltage applier so as to charge the particle absorption tool.

2. The charging system according to claim 1, wherein an exterior shape of the charger container is common to an exterior shape of the FOUP; and the charger container is configured to be able to accommodate the particle absorption tool.

3. The charging system according to claim 1, wherein the charger includes an electric-power storage configured to store electric power; and the charging system further comprises an electric-power supplier arranged outside the charger container and configured to wirelessly charge the electric-power storage.

4. The charging system according to claim 1, wherein the charger includes a contact detector configured to detect information on the contact of the voltage applier with the particle absorption tool; and the charger is configured to start to apply the voltage to the particle absorption tool through the voltage applier in response to the detection of the information on the contact of the voltage applier with the particle absorption tool detected by the contact detector.

5. The charging system according to claim 1, wherein the voltage applier is arranged inside the charger container, and faces downward; and the controller is configured to perform operations further comprising operations to direct the robot arm to move the particle absorption tool held by the hand upward to bring the particle absorption tool into contact with the voltage applier so as to charge the particle absorption tool.

6. The charging system according to claim 1, wherein the charger container previously accommodates the particle absorption tool; and the controller is configured to perform operations further comprising operations to direct the robot arm to move and to direct the hand to hold the particle absorption tool, which is previously accommodated in the charger container, and to then direct the robot arm to move to bring the particle absorption tool held by the hand into contact with the voltage applier.

7. The charging system according to claim 6 wherein the controller is configured to perform operations further comprising operations, after bringing the particle absorption tool held by the hand into contact with the voltage applier and charging the particle absorption tool, to move the robot arm and to then absorb particles in at least one of the interior of the substrate conveyor and an interior of a substrate processor by using the particle absorption tool held by the hand.

8. The charging system according to claim 7 further comprising a particle detector configured to detect a degree of particle absorption by the particle absorption tool during a series of operations of the robot arm.

9. The charging system according to claim 8, wherein the particle detector includes at least one of a charge-amount detector configured to detect a charge amount of the particle absorption tool, and an image capturer configured to capture an image of the particles that are absorbed by the particle absorption tool.

10. The charging system according to claim 8, wherein the particle detector is arranged in the charger container.

11. The charging system according to claim 7 further comprising a cleaner configured to clean the particle absorption tool, wherein the controller is configured to perform operations further comprising operations to, after absorbing particles by using the particle absorption tool, move the robot arm so as to move the particle absorption tool to the cleaner; and the cleaner is configured to clean the particle absorption tool moved.

12. The charging system according to claim 1, wherein the charger container previously accommodates a plurality of particle absorption tools as the particle absorption tool; and the controller is configured to perform operations further comprising operations to sequentially change the plurality of particle absorption tools from one after another so as to absorb particles in at least one of the interior of the substrate conveyor and an interior of a substrate processor.

13. The charging system according to claim 1, wherein the charger includes a voltage applier configured to contact the particle absorption tool and to apply a voltage to the particle absorption tool;

the charger container previously accommodates a plurality of particle absorption tools as the particle absorption tool; and the voltage applier is configured to simultaneously apply the voltage to the plurality of particle absorption tools.

14. A method for controlling a charging system comprising:

electrostatically charging a particle absorption tool configured to build up a static electric charge so as to absorb particles by using a charger accommodated in a charger container arranged in a place where a FOUP for accommodating substrates is arranged and having an opening that is opened toward an interior of a substrate conveyor; and absorbing the particles by using the particle absorption tool building up the static electric charge, wherein electrostatically charging a particle absorption tool comprises contacting the particle absorption tool by a voltage applier to apply a voltage to the particle absorption tool;

directing a hand of a robot arm to hold the particle absorption tool; and directing the robot arm to move to bring the particle absorption tool held by the hand into contact with the voltage applier so as to charge the particle absorption tool.

* * * * *